(12) United States Patent
Chou et al.

(10) Patent No.: US 8,031,497 B2
(45) Date of Patent: Oct. 4, 2011

(54) THREE-LEG POWER CONVERTER APPARATUS

(75) Inventors: Hung-Liang Chou, Kaohsiung (TW);
Yu-Hua Sun, Kaohsiung (TW);
Chin-Chang Wu, Kaohsiung (TW);
Ya-Tsung Feng, Kaohsiung (TW)

(73) Assignee: Ablerex Electronics Co., Ltd., Taipei (TW)

( * ) Notice: Subject to any disclaimer, the term of this patent is extended or adjusted under 35 U.S.C. 154(b) by 358 days.

(21) Appl. No.: 12/432,839

(22) Filed: Apr. 30, 2009

(65) Prior Publication Data

US 2010/0201341 A1    Aug. 12, 2010

(30) Foreign Application Priority Data

Jan. 17, 2009   (TW) ................................ 98101755 A (51) Int. Cl.
*H02M 3/24* (2006.01)
*G05F 1/10* (2006.01)

(52) U.S. Cl. ........................ 363/98; 363/132; 323/237
(58) Field of Classification Search .............. 323/237, 323/240, 300, 301; 363/40, 98, 132
See application file for complete search history.

(56) References Cited

U.S. PATENT DOCUMENTS

| 4,953,068 | A | | 8/1990 | Henze |
| 5,134,355 | A | | 7/1992 | Hastings |
| 5,852,558 | A | * | 12/1998 | Julian et al. ................ 363/132 |
| 5,936,855 | A | * | 8/1999 | Salmon .......................... 363/46 |
| 5,973,491 | A | * | 10/1999 | Onizuka et al. ............ 363/124 |
| 6,678,174 | B2 | | 1/2004 | Suzui et al. |
| 7,079,406 | B2 | | 7/2006 | Kurokami et al. |
| 7,301,787 | B2 | * | 11/2007 | Wu et al. ....................... 363/39 |
| 7,570,029 | B2 | * | 8/2009 | Wu et al. ..................... 323/207 |

\* cited by examiner

*Primary Examiner* — Jessica Han
(74) *Attorney, Agent, or Firm* — Alan Kamrath; Kamrath & Associates PA (57) ABSTRACT

A three-leg power converter apparatus including first, second and third input/output ports, a three-leg bridge converter, a filter circuit, a decoupling circuit and a controller is presented. The three-leg bridge converter has three single-leg circuits, two DC terminals connecting to two terminals of the first input/output port, and three mid-terminals with each of them being formed by a middle point of one of the three single-leg circuits. The controller connects to the three-leg bridge converter for controlling an input or output current passing through each DC terminal and mid-terminal. The filter circuit connects between two of the mid-terminals and the second input/output port. The decoupling circuit has two terminals connecting to the second input/output port and another terminal connecting to a terminal of the third input/output port, with the third input/output port having another terminal connecting to the other mid-terminal that dose not connect with the filter circuit.

11 Claims, 8 Drawing Sheets

THREE-LEG POWER CONVERTER APPARATUS

BACKGROUND OF THE INVENTION

1. Field of the Invention

The present invention relates to a three-leg power converter apparatus, and more particularly to a power converter apparatus with three input/output ports for converting electrical power between these three ports.

2. Description of the Related Art

Recently, owing to the rapid development in Power Electronics, some apparatuses based on technology of power electronics have been applied to fields relative to power conversion. Basically, there are four typical types in operation of power conversion: AC/DC, DC/DC, DC/AC, and AC/AC, which are realized by apparatuses such as AC/DC converters, DC/DC converters, DC/AC inverters and AC/AC converters. Generally, a power converter apparatus with single power stage can only complete one of said typical types in operation of power conversion, and plural and different types of power converters are required while a complex power conversion function has to be achieved.

Figure 1:
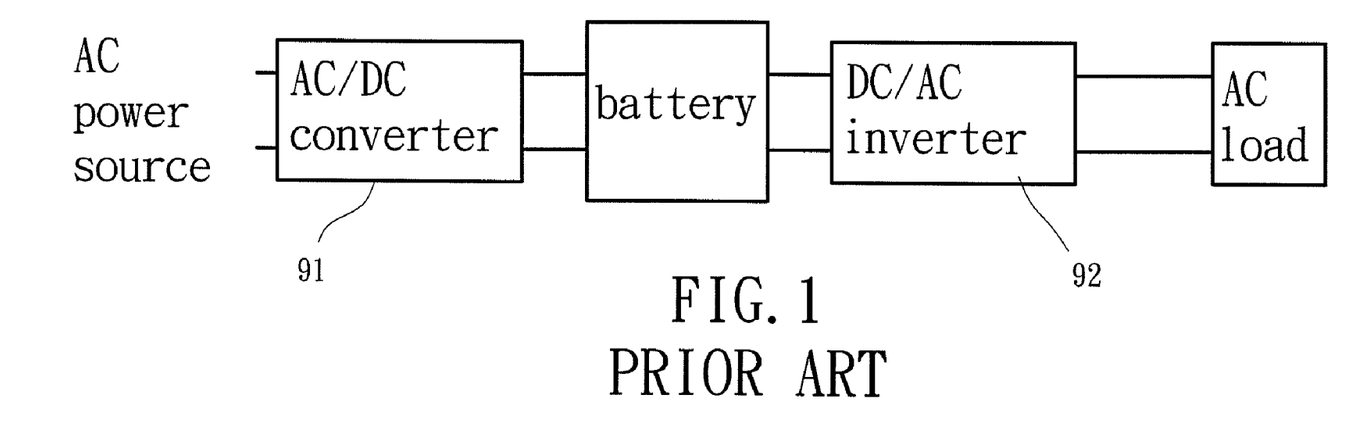
FIG. 1 is a schematic circuit of a conventional power converter apparatus for an on-line UPS system.
Figure 2:
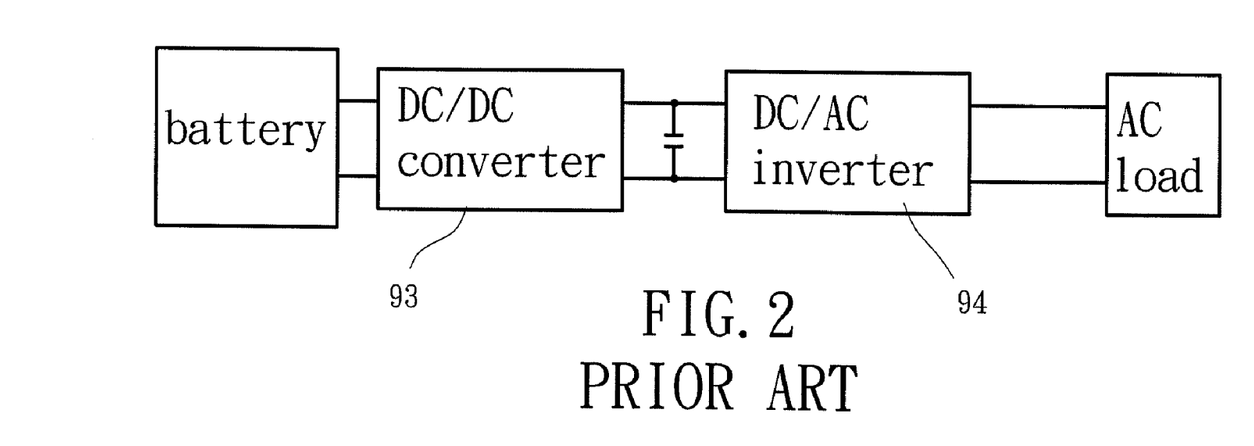
FIG. 2 is a schematic circuit of a conventional power converter apparatus for an off-line UPS system.
Figure 3:
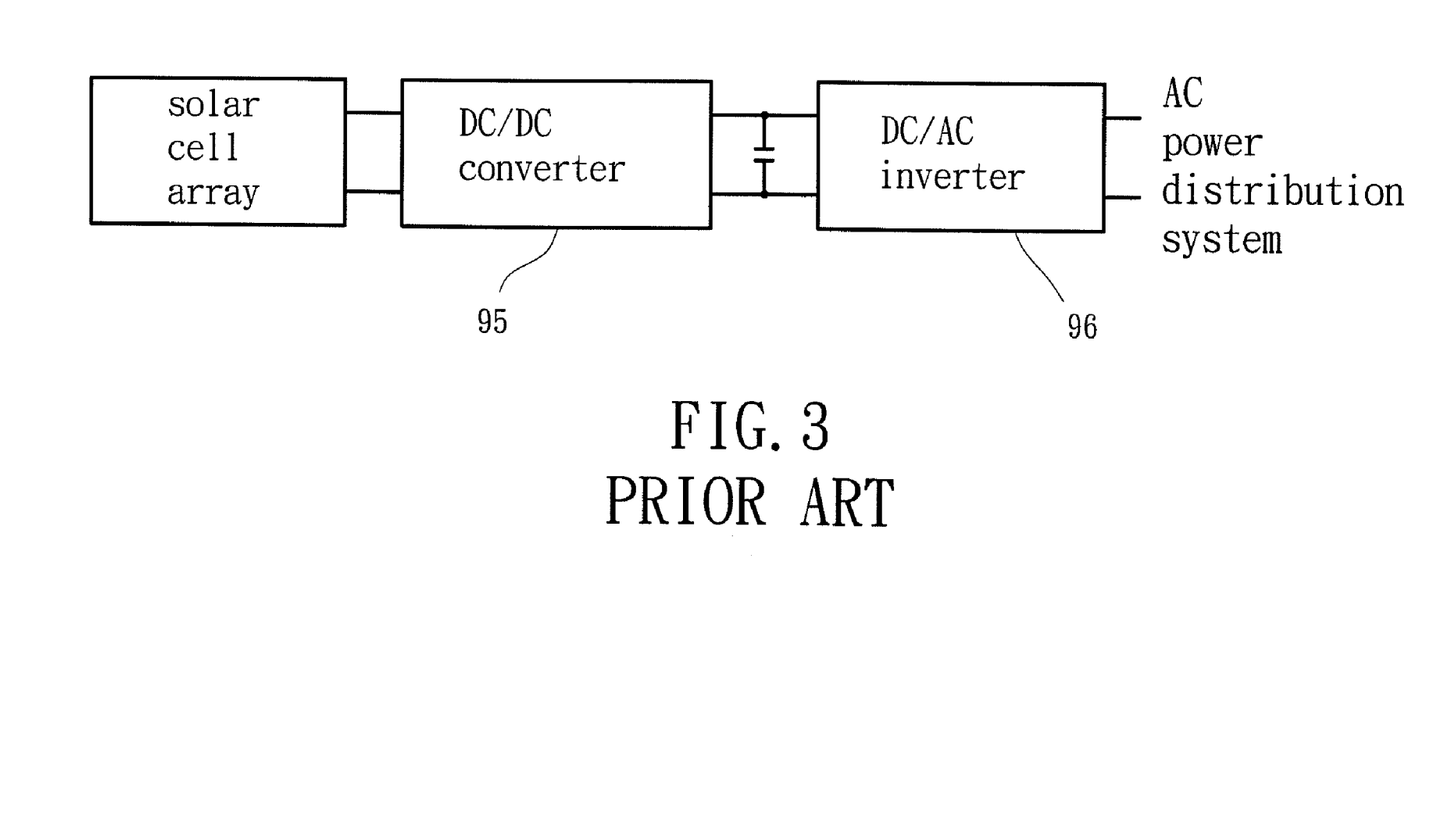
FIG. 3 is a schematic circuit of a conventional power converter apparatus for a photovoltaic generation system.

For example, a conventional on-line UPS (uninterruptible power supply) system shown in FIG. 1 includes two power stages 91, 92, wherein the power stage 91 is an AC/DC converter and the other power stage 92 is a DC/AC inverter, so that a normal AC power can be converted into an AC power for an AC load. Furthermore, a conventional off-line UPS system with small capacity is illustrated in FIG. 2. Regarding to the off-line UPS system, a requirement for providing two power stages 93, 94 is needed because the battery voltage of a limited amount of batteries is evidently lower than the required DC voltage of DC/AC inverter 94 applied in the off-line UPS system. The power stage 93 is a DC/DC converter acting as a boost converter for raising a DC voltage of the batteries, and the power stage 94 is a DC/AC inverter for converting the DC power generated by the power stage 93 into an AC power for an AC load. Moreover, a kind of power converter apparatuses for a photovoltaic generation system disclosed in US patents numbered U.S. Pat. No. 7,079,406 and U.S. Pat. No. 6,678,174 is illustrated by FIG. 3. In the above-mentioned power converter apparatus, there are two power stages 95, 96 connected between a solar cell array and an AC power distribution system, with the power stage 95 converting a variable DC power generated by the solar cell array into a regulated DC power and the power stage 96 further converting the DC power into an AC power and then injecting the AC power into the AC power distribution system.

Accordingly, for most conventional power converter apparatuses to complete a complex power conversion operation including at least two typical types in operation of power conversion, at least two power stages are required. Hence, the power electronic circuits and the control circuits of conventional power converter apparatuses with complex power conversion operation are complicated, and a cost for manufacture of the conventional power converter apparatus is high. As a result, there is a need for redesigning the conventional power converter apparatus for implementation thereof.

SUMMARY OF THE INVENTION

The primary objective of this invention is to provide a three-leg power converter apparatus to convert various kinds of electrical power between three input/output ports.

A three-leg power converter apparatus according to the preferred teachings of the present invention includes a first input/output port, a second input/output port, a third input/output port, a three-leg bridge converter, a controller, a filter circuit and a decoupling circuit. Each of the first, second and third input/output ports has two terminals. The three-leg bridge converter has three single-leg circuits connecting to each other in parallel, two DC terminals connecting to the two terminals of the first input/output port, and three mid-terminals with each of them being formed by a middle point of one of the three single-leg circuits. The controller electrically connects to the three-leg bridge converter for controlling an input or output current passing through each DC terminal and mid-terminal. The filter circuit has one side connecting to two of the mid-terminals of the three-leg bridge converter and another side connecting to the two terminals of the second input/output port. And, the decoupling circuit has a first terminal and a second terminal respectively connecting to the two terminals of the second input/output port and a third terminal connecting to one of the two terminals of the third input/output port, with the other terminal of the third input/output port connecting to the other mid-terminal of the three-leg bridge converter that dose not connect with the filter circuit.

Accordingly, the controller controls a plurality of power electronic switches of the three-leg bridge converter by current mode control to further control currents of the three-leg bridge converter passing through the mid-terminals connected to the filter circuit. Each of the two currents passing through the mid-terminals connected to the filter circuit has a first component and a second component, with the first components of said currents having equal values but opposite phases and the second components of them having equal values and phases.

Further scope of the applicability of the present invention will become apparent from the detailed description given hereinafter in connection with drawings. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter, and the accompanying drawings that are given by way of illustration only are not limitations of the present invention, wherein.

In the various figures of the drawings, the same numerals designate the same or similar parts. Furthermore, when the terms "first", "second", "third", and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 4:
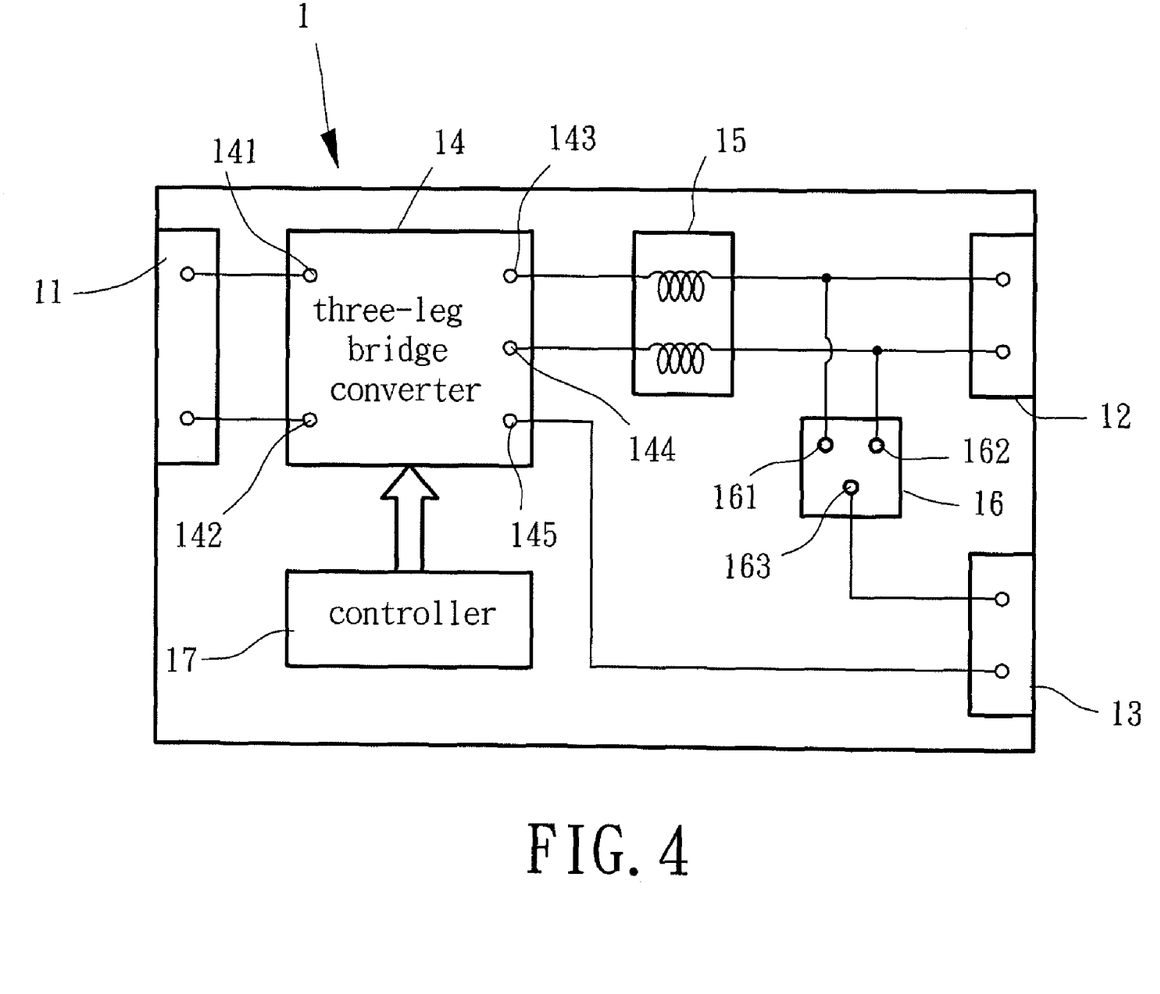
FIG. 4 is schematic circuit of a preferred embodiment of the present invention of a three-leg power converter apparatus.

Referring now to FIG. 4, a preferred embodiment of the present invention of a three-leg power converter apparatus 1 is illustrated. The three-leg power converter apparatus 1 includes a first I/O (input/output) port 11, a second I/O port 12, a third I/O port 13, a three-leg bridge converter 14, a filter circuit 15, a decoupling circuit 16, and a controller 17. Each of the first, second and third I/O ports 11, 12, 13 has two terminals for connecting to at least one AC or DC device, that is, power source, load or capacitor, for the three-leg power converter apparatus 1 to convert an AC or DC power provided by the AC or DC power source into a suitable formation of power for the AC or DC load, or for a power conversion between two different power sources. The three-leg bridge converter 14 is constructed by three single-leg circuits connecting to each other in parallel and has two DC terminals 141, 142 connecting to the two terminals of the first I/O port 11. Besides, the three-leg bridge converter 14 further has three mid-terminals 143, 144, 145, with each single-leg circuit having a middle point to form the three mid-terminals 143, 144, 145, wherein the mid-terminals 143, 144 connect to the filter circuit 15 while the other mid-terminal 145 connects to one of the terminals of the third I/O port 13. The filter circuit 15 connects between the mid-terminals 143, 144 and the terminals of the second I/O port 12 and is preferably constructed by two inductors to filter the high frequency harmonic currents generated by the three-leg bridge converter 14. Besides, one of the inductors links between one of the terminals of the second I/O port 12 and the mid-terminal 143 while the other one of the inductors links between the other terminal of the second I/O port 12 and the mid-terminal 144. The decoupling circuit 16 includes a first terminal 161 and a second terminal 162 respectively connecting to the two terminals of the second I/O port 12 and a third terminal 163 connecting to the other terminal of the third I/O port 13, which dose not connect to the mid-terminal 145. The controller 17 electrically connects to the three-leg bridge converter 14 to control currents passing through the DC terminals 141, 142 and mid-terminals 143, 144, 145.

Figure 5A:
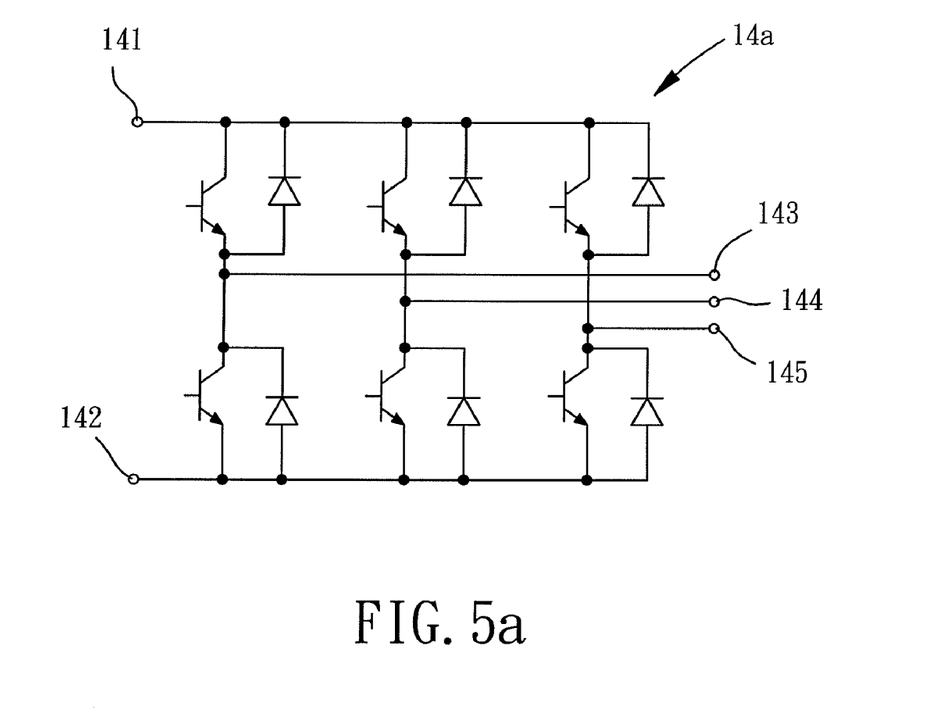
FIG. 5a is a schematic circuit of an example of a three-leg bridge converter of the preferred embodiment of the three-leg power converter apparatus.
Figure 5B:
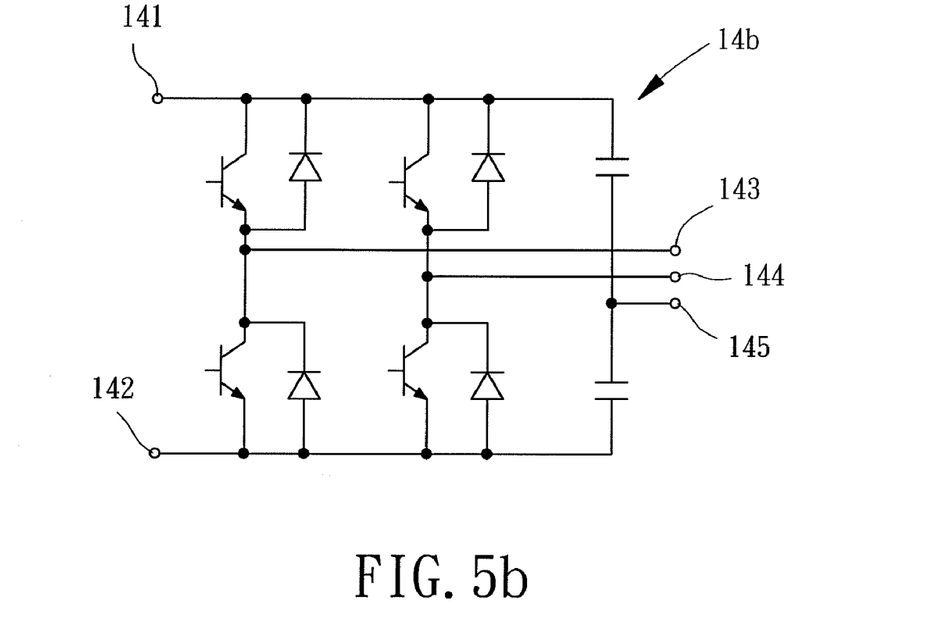
FIG. 5b is a schematic circuit of another example of the three-leg bridge converter of the preferred embodiment of the three-leg power converter apparatus.

Turning to FIGS. 5a and 5b now, two examples of the three-leg bridge converter 14, three-leg bridge converters 14a, 14b, are illustrated. In detail, each single-leg circuit of the three-leg bridge converter 14a shown in FIG. 5a includes two serially connected switch sets with each switch set having a power electronic switch and a diode connected in parallel. Thereby, each single-leg circuit has two DC ends, with all the three single-leg circuits providing one of the two DC ends to jointly form a parallel connecting end as the DC terminal 141 and the other DC ends to jointly form another parallel connecting end as the DC terminal 142. And a connected point between the two switch sets of each single-leg circuit, that is, the middle point of each single-leg circuit forms the mid-terminal 143, 144 or 145.

In comparison with the three-leg bridge converter 14a, regarding to the three-leg bridge converter 14b shown in FIG. 5b, only two single-leg circuits providing the mid-terminals 143, 144 have serially connected switch sets while the other single-leg circuit has two serially connected capacitors. Furthermore, capacitances of the two capacitors are equal and a connected point between the two capacitors forms the mid-terminal 145. Specifically, no matter the three-leg bridge converter 14 is selected from which one of the three-leg bridge converters 14a, 14b, the controller 17 connects to the power electronic switch of each switch set to determine whether each of the power electronic switch is ON or OFF.

Figure 6A:
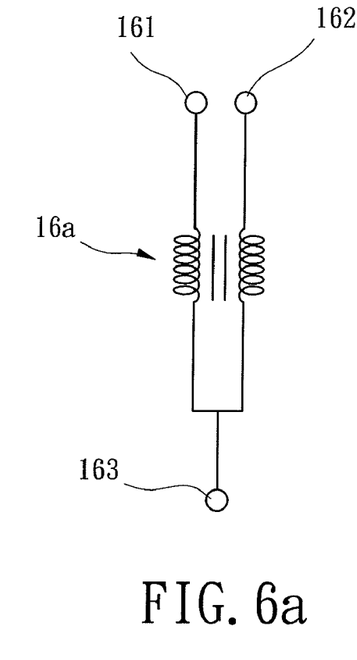
FIG. 6a is a schematic circuit of an example of a decoupling circuit of the preferred embodiment of the three-leg power converter apparatus.
Figure 6B:
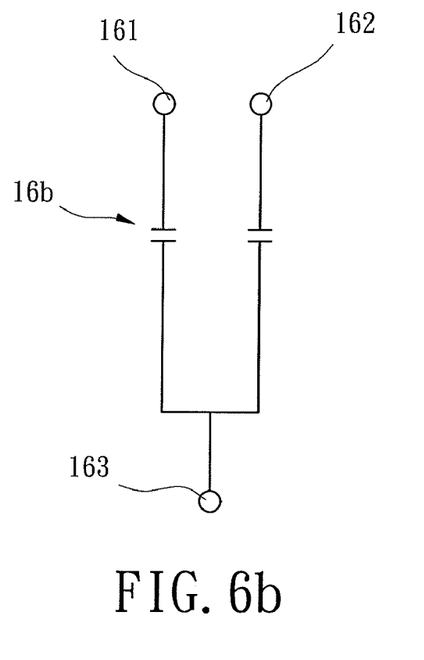
FIG. 6b is a schematic circuit of another example of the decoupling circuit of the preferred embodiment of the three-leg power converter apparatus.

Please refer to FIGS. 6a and 6b, wherein two examples of the decoupling circuit 16, which are decoupling circuits 16a, 16b, are illustrated. The decoupling circuit 16a shown in FIG. 6a is a transformer with a number of turns in primary coil of the transformer being equal to that in the secondary coil thereof. Moreover, one end of the primary coil forms the first terminal 161, one end of the secondary coil forms the second terminal 162, and the other ends of the primary and secondary coils connect to each other to jointly form the third terminal 163. Because the numbers of the turns of the primary and secondary coils are equal, two input or output currents of the decoupling circuit 16a passing through the first and second terminals 161, 162 are also equal. In detail, the input currents are combined to form a output current and flow out of the decoupling circuit 16a through the third terminal 163 after flowing into the decoupling circuit 16a through the first and second terminals 161, 162. Alternatively, before the identical output currents flow out of the decoupling circuit 16a through the first and second terminals 161, 162, there must be an input current previously flowing into the decoupling circuit 16a through the third terminal 163 and being divided into the two identical output currents. Furthermore, for the second I/O port 12, the transformer of the decoupling circuit 16a is equivalent to an open circuit.

Regarding to the decoupling circuit 16b shown in FIG. 6b, it includes two capacitors having equal capacitances, with both of the capacitors providing one end to form the first and second terminals 161, 162 and another end connecting to each other to form the third terminal 163. Thereby, the decoupling circuit 16b can combine the input currents that flow into the decoupling circuit 16b through the first and second terminals 161, 162 to form the output current that flows out of the decoupling circuit 16b through the third terminal 163. Alternatively, the decoupling circuit 16b can also divide the input current, which flows into the decoupling circuit 16b through the third terminal 163, into the identical output currents flowing out of the decoupling circuit 16b through the first and second terminals 161, 162. Moreover, for the second I/O port 12, the two capacitors of the decoupling circuit 16b are equivalent to a capacitor with capacitance being a half of that of any one of the two capacitors.

Referring to FIGS. 4 through 6b, the controller 17 controls the power electronic switches of the three-leg bridge converter 14 by current mode control, and thus an output or input current of the three-leg bridge converter 14 passing through the mid-terminal 143 and an output or input current of the three-leg bridge converter 14 passing through the mid-terminal 144 are controlled. Specifically, each of the two currents passing through the mid-terminals 143, 144 includes a first component and a second component, with the first components of the two currents having equal values but opposite phases while the second components of them having equal values and phases. For the first components of said two currents passing through the mid-terminals 143, 144, the decoupling circuit 16 is regarded as an open circuit constructing from the decoupling circuit 16a or as a capacitor constructing from the decoupling circuit 16b where the capacitor is so formed as a filter. And thus, the major first components of the two currents passing through the mid-terminals 143, 144 can only flow into or out of the second I/O port 12 and devices electrically connecting to the second I/O port 12. Namely, one of the first components flows out of the three-leg power converter apparatus 1 through one of the terminals of the second I/O port 12 while the other first component flows into the three-leg power converter apparatus 1 through the other terminal of the second I/O port 12. On the contrary, in order to construct a current loop in the devices electrically connecting to the second I/O port 12, currents passing through the terminals of the second I/O port 12 must have opposite current directions, that is, opposite phases. Therefore, the second components of the two currents passing through the mid-terminals 143, 144 cannot flow out of or into the three-leg power converter apparatus 1 through the second I/O port 12 owing to equal values and phases thereof. However, for the equal values and phases of the second components, the second components are able to flow into or out of the decoupling circuit 16 through the first and second terminals 161, 162 to be regarded as the input or output currents of the decoupling circuit 16. In detail, the second components may flow into the decoupling circuit 16 and then be combined to form the output current of the decoupling circuit 16, with the output current being sent out of the three-leg power converter apparatus 1 sequentially through the third terminal 163 and one of the terminals of the third I/O port 13, passing through devices electrically connecting to the third I/O port 13, and flowing back to the three-leg bridge converter 14 through the other terminal of the third I/O port 13 and the mid-terminal 145. Alternatively, the second components may flow out of the decoupling circuit 16 after a current generated by the three-leg bridge converter 14 flows out of the three-leg power converter apparatus 1 through the mid-terminal 145 and one of the terminals of the third I/O port 13, passes through the devices electrically connecting to the third I/O port 13, flows back to the decoupling circuit 16 through the other terminal of the third I/O port 13 to be regarded as the input current, and is divided into the two identical output currents of the decoupling circuit 16, that is, the second components of the two currents passing through the mid-terminals 143, 144.

Accordingly, the three-leg power converter apparatus 1 is able to independently output or input currents via the second and third I/O ports 12, 13 for power conversion. Besides, according to the law of the conservation of energy, the difference in energy between the currents passing through the second and third I/O ports 12, 13 results in an amount of electrical energy, which equals to said difference in energy and is outputted from or inputted into the three-leg power converter apparatus 1 through the first I/O port 11. Therefore, the three-leg power converter apparatus 1 is able to complete the power conversion between the first, second and third I/O ports 11, 12, 13 by utilizing only one power stage: the three-leg bridge converter 14, and thus a simplification in power and control circuits for complex power conversion is achieved. Please note that the first I/O port 11 can only connect to a DC device, the second and third I/O ports 12, 13 can freely connect to any AC or DC devices when the decoupling circuit 16b is used, and the second I/O port 12 can only connect to an AC device when the decoupling circuit 16a is used, wherein each of the above-mentioned devices is preferably selected from a power source or a load.

Figure 7A:
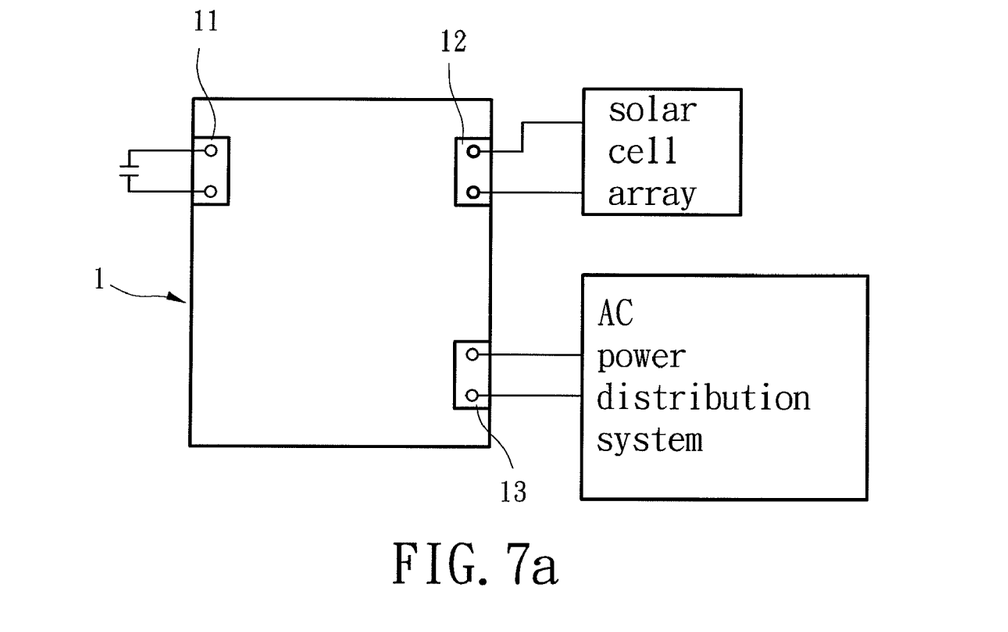
FIG. 7a is a schematic circuit of an example of use of the three-leg power converter apparatus in a grid-connected photovoltaic generation system.
Figure 7B:
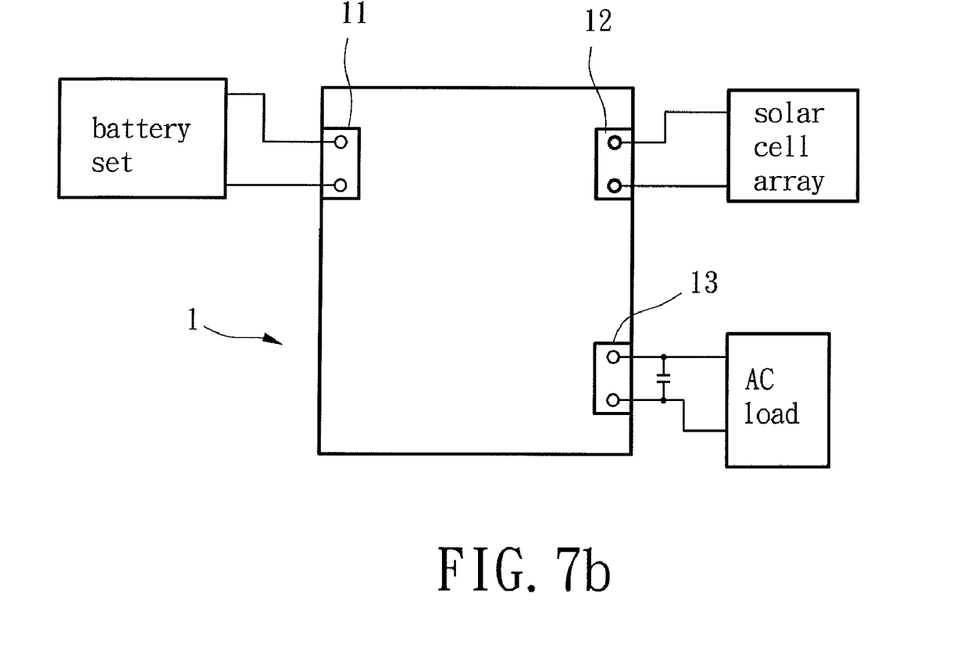
FIG. 7b is a schematic circuit of an example of use of the three-leg power converter apparatus in a stand-alone photovoltaic generation system.
Figure 7C:
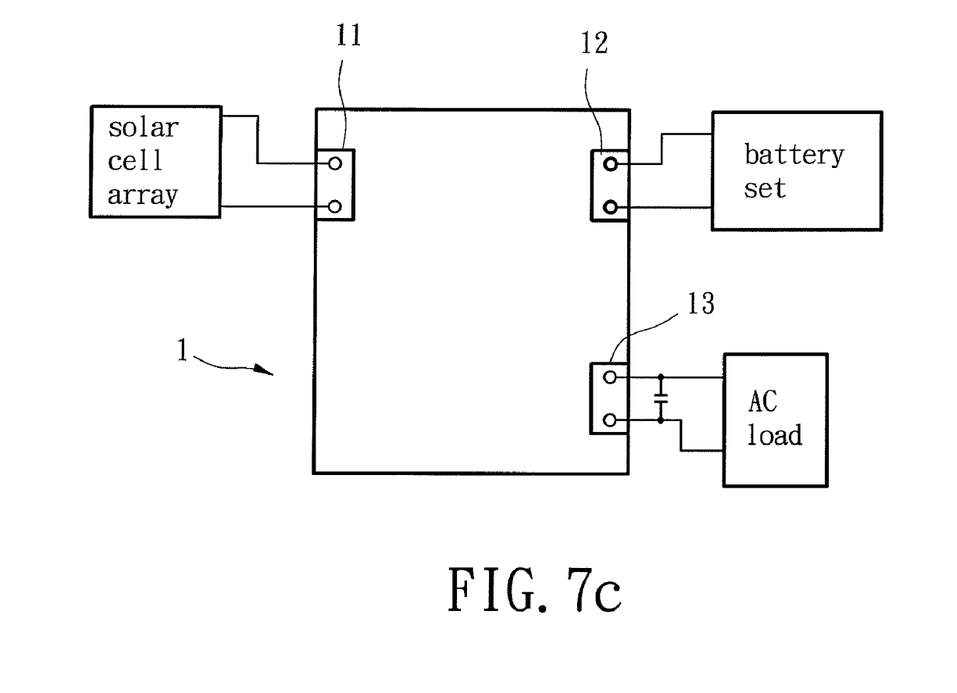
FIG. 7c is a schematic circuit of another example of use of the three-leg power converter apparatus in the stand-alone photovoltaic generation system.

Turning to FIGS. 7a, 7b and 7c now, schematic circuits for illustrating examples of use of the three-leg power converter apparatus 1 in a photovoltaic generation system are shown. Referring to FIG. 7a, a grid-connected photovoltaic generation system is utilized as the photovoltaic generation system, with the first I/O port 11 connecting to a DC capacitor, the second I/O port 12 connecting to a solar cell array, and the third I/O port 13 connecting to an AC power distribution system, wherein the DC capacitor connected to the first I/O port 11 can be omitted when the three-leg bridge converter 14b is applied. Besides, because the transformer for forming the decoupling circuit 16a is regarded as a short circuit for a DC power source, the decoupling circuit 16a is not suitable but the decoupling circuit 16b is preferable for the example shown in FIG. 7a. In operation, for the example shown in FIG. 7a, a DC power source constructed by the solar cell array provides the two terminals of the second I/O port 12 with two currents having equal values but opposite phases. Therefore, through a control over the first components of said two currents passing through the mid-terminals 143, 144, the output power of the solar cell array are adjustable. On the other hand, through a control over the second components of said two currents passing through the mid-terminals 143, 144, the output current passing through the third terminal 163 of the decoupling circuit 16 can be adjusted to be sinusoidal and in phase with the voltage of the AC power distribution system and then fed into the AC power distribution system through the third I/O port 13. Furthermore, the difference in power between the DC power inputted by the second I/O port 12 and the AC power outputted by the third I/O port 13 builds a steady DC voltage on the capacitor connected with the first I/O port 11, so as to maintain the three-leg bridge converter 14 under a normal operation. Consequently, the three-leg power converter apparatus 1 can directly convert the DC power generated by the solar cell array into the AC power and then feed the AC power to the AC power distribution system.

Further, referring to FIG. 7b, a stand-alone photovoltaic generation system is utilized as the photovoltaic generation system, with the first I/O port 11 connecting to a battery set, the second I/O port 12 connecting to a solar cell array, and the third I/O port 13 connecting to an AC capacitor and an AC load. Besides, for the same reason that the transformer forming the decoupling circuit 16a is regarded as a short circuit for a DC power source, the decoupling circuit 16a is not suitable but the decoupling circuit 16b is preferable to the example shown in FIG. 7b. In operation, the example shown in FIG. 7b, a DC power source constructed by the solar cell array provides the two terminals of the second I/O port 12 with two currents having equal values but opposite phases. Therefore, through a control over the first components of said two currents passing through the mid-terminals 143, 144, the output power of the solar cell array are adjustable. On the other hand, through a control over the second components of said two currents passing through the mid-terminals 143, 144, the output current passing through the third terminal 163 can be adjusted, so as to build an AC voltage on the AC capacitor connected to the third I/O port 13 and supply said AC voltage to the AC load connected to the third I/O port 13. Furthermore, the difference in power between the DC power inputted by the second I/O port 12 and the AC power outputted by the third I/O port 13 controls the battery set connected with the first I/O port 11 to be charged with or discharge another DC power. Consequently, the electrical power generated by the solar cell array can satisfy a requirement of the AC load and, meanwhile, charge the battery set with said another DC power when the degree of illumination for the solar cell array is large enough. Alternatively, the battery set can discharge the said another DC power to offset the lack of the electrical power generated by the solar cell array for the AC load when the degree of illumination for the solar cell array is small.

Furthermore, referring to FIG. 7c now, another example for the stand-alone photovoltaic generation system utilized as the photovoltaic generation system is shown, with the first I/O port 11 connecting to a solar cell array, the second I/O port 12 connecting to the battery set, and the third I/O port 13 still connecting to the AC capacitor and the AC load. Besides, because the transformer forming the decoupling circuit 16a is regarded as a short circuit for a DC power source, the decoupling circuit 16a is not suitable but the decoupling circuit 16b is preferable to the example shown in FIG. 7c. In operation, the example shown in FIG. 7c, through a control over the first components of said two currents passing through the mid-terminals 143, 144, the battery set connected with the second I/O port 12 is charged with or discharges a DC power. On the other hand, through a control over the second components of said two currents passing through the mid-terminals 143, 144, the output current passing through the third terminal 163 can build an AC voltage on the AC capacitor connected to the third I/O port 13 and supply said AC voltage to the AC load connected to the third I/O port 13. Furthermore, the difference in power between the DC power inputted or outputted by the second I/O port 12 and an AC power outputted by the third I/O port 13 determines an outputted DC power generated by the solar cell array that connects to the first I/O port 11. Consequently, the outputted DC power generated by the solar cell array can satisfy a requirement of the AC load and, meanwhile, charge the battery set when the degree of illumination for the solar cell array is large enough. Alternatively, the battery set can discharge the DC power to jointly satisfy the requirement of the AC load with the solar cell array when the degree of illumination for the solar cell array is small.

Figure 8:
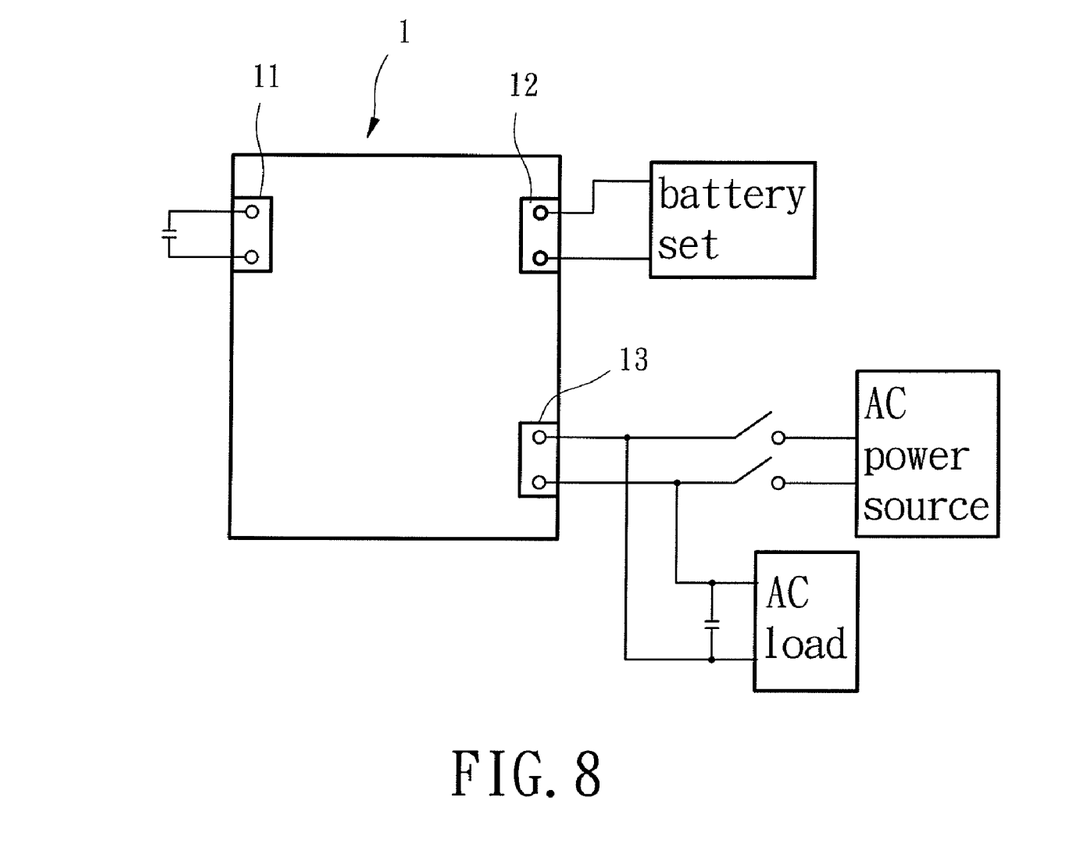
FIG. 8 is a schematic circuit of an example of use of the three-leg power converter apparatus in an UPS system.

Turning to FIG. 8, a schematic circuit regarding to an example of use of the three-leg power converter apparatus 1 in an UPS system is shown, with the first I/O port 11 connecting to a DC capacitor, the second I/O port 12 connecting to a battery set, and the third I/O port 13 connecting to an AC capacitor and an AC load, wherein the third I/O port 13 further connects to an AC power source through a switch device, and the DC capacitor connected to the first I/O port 11 can be omitted when the three-leg bridge converter 14b is applied. Besides, because the transformer forming the decoupling circuit 16a is regarded as a short circuit for a DC power source, the decoupling circuit 16a is not suitable but the decoupling circuit 16b is preferable to the example shown in FIG. 8. In operation, the example shown in FIG. 8, when the AC power source is normal, the switch device is turned-on for the AC power source to satisfy a requirement of the AC load. Hence, through a control over the first components of said two currents passing through the mid-terminals 143, 144, the battery set connected with the second I/O port 12 is charged. And, through a control over the second components of said two currents passing through the mid-terminals 143, 144, the output current passing through the third terminal 163 can determine an amount of an AC power that is generated by the AC power source and inputted into the three-leg power converter apparatus 1 through the third I/O port 13. The difference in power between a DC power outputted by the second I/O port 12 and the AC power inputted by the third I/O port 13 builds a steady DC voltage on the DC capacitor connected with the first I/O port 11, so as to maintain the three-leg bridge converter 14 under a normal operation.

However, when the AC power source fails, the switch device is opened, and the control over the first components of said two currents passing through the mid-terminals 143, 144 drives the battery set connected with the second I/O port 12 to discharge a DC power while the control over the second components of said two currents passing through the mid-terminals 143, 144 drives the output current to build an AC voltage on the AC capacitor and supply said AC voltage to the AC load for the AC load to keep working without an interruption. The difference in power between the DC power inputted by the second I/O port 12 and an AC power outputted by the third I/O port 13 also builds a steady DC voltage on the DC capacitor connected with the first I/O port 11, so as to maintain the three-leg bridge converter 14 under a normal operation.

Figure 9A:
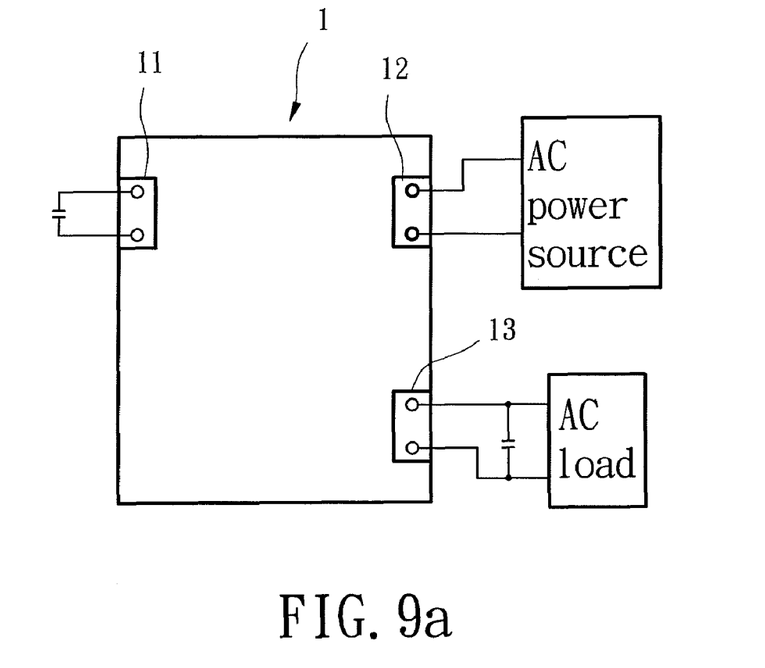
FIG. 9a is a schematic circuit of an example of use of the three-leg power converter apparatus in a power conditioner.
Figure 9B:
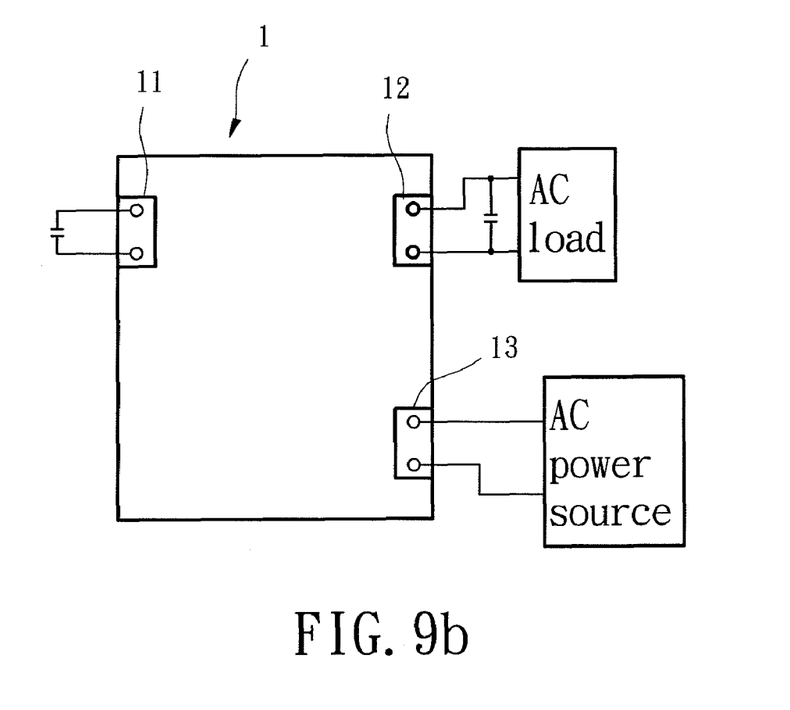
FIG. 9b is a schematic circuit of another example of use of the three-leg power converter apparatus in the power conditioner.

Now turning to FIGS. 9a and 9b, schematic circuits for illustrating examples of use of the three-leg power converter apparatus 1 in a power conditioner are shown. Referring to FIG. 9a, the first I/O port 11 connects to a DC capacitor, the second I/O port 12 connects to an AC power source, and the third I/O port 13 connects to an AC capacitor and an AC load, wherein the DC capacitor connected to the first I/O port 11 can be omitted when the three-leg bridge converter 14b is applied. In operation, the example shown in FIG. 9a, through a control over the first components of said two currents passing through the mid-terminals 143, 144, an input current of the AC power source can approximate to a sine wave whose phase is equal to that of the voltage of the AC power source, so as to obtain a unity power factor from the AC power source. On the other hand, through a control over the second components of said two currents passing through the mid-terminals 143, 144, the output current passing through the third terminal 163 can be adjusted for building an AC voltage on the AC capacitor and supplying said AC voltage to the AC load. Please be noted that the said AC voltage is preferably with an amplitude and/or a frequency different from those of the voltage of the AC power source, such that the said AC voltage is surely free from an influence caused by the AC power source. Furthermore, the difference in power between an AC power inputted by the second I/O port 12 and another AC power outputted by the third I/O port 13 builds a steady DC voltage on the DC capacitor connected with the first I/O port 11, so as to maintain the three-leg bridge converter 14 under a normal operation.

Referring to FIG. 9b now, another example for the use of the three-leg power converter apparatus 1 in the power conditioner is shown, with the first I/O port 11 connecting to the DC capacitor, the second I/O port 12 connecting to the AC capacitor and the AC load, and the third I/O port 13 connecting to the AC power source, wherein the DC capacitor connected to the first I/O port 11 can also be omitted when the three-leg bridge converter 14b is applied. The operation of the example shown in FIG. 9b is similar to that of the example shown in FIG. 9a except that the devices connecting to the second and third I/O ports 12, 13 are exchanged.

Moreover, for the examples shown in FIGS. 8, 9a and 9b, the AC power sources are preferably selected from an AC power distribution system or an electrical power generator, with the electrical power generator is preferably of a diesel-electric set or a wind power plant.

In sum, the three-leg power converter apparatus 1 of the present invention provides only one power stage, that is, the three-leg bridge converter 14 and controls only the first and second components of the two currents passing through the mid-terminals 143, 144. And electrical power can be transformed between the first, second and third I/O ports 11, 12, 13 while various functions in power conversion are accomplished according to the devices connecting to the three I/O ports 11, 12, 13. As a result, the present invention, the three-leg power converter apparatus 1, has advantages such as providing simplified structures in power electronic circuit and control circuit, decreasing a cost for manufacture thereof, and broadening a scope in use thereof.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A three-leg power converter apparatus, comprising:
    a first input/output port, a second input/output port, and a third input/output port with each of them having two terminals;
    a three-leg bridge converter having three single-leg circuits, two DC terminals connecting with the two terminals of the first input/output port, and three mid-terminals, with each mid-terminal being located at a middle point of one of the three single-leg circuits;
    a controller electrically connecting to the three-leg bridge converter for controlling an input or output current passing through each DC terminal and mid-terminal;
    a filter circuit having one side connecting to two of the mid-terminals of the three-leg bridge converter and another side connecting to the two terminals of the second input/output port; and
    a decoupling circuit having a first terminal and a second terminal respectively connecting to the two terminals of the second input/output port and a third terminal connecting to one of the two terminals of the third input/output port, with the other terminal of the third input/output port connecting to the other mid-terminal that dose not connect with the filter circuit.

2. The three-leg power converter apparatus as defined in claim 1, wherein the three single-leg circuits connect to each other in parallel and each single-leg circuit has two serially connected power electronic switch sets, with a connected point between the two power electronic switch sets forming with one of the middle points, two parallel connecting ends of the three single-leg circuits respectively forming the two DC terminals, and the controller connecting to every power electronic switch set.

3. The three-leg power converter apparatus as defined in claim 1, wherein the three single-leg circuits connect to each other in parallel, one of the three single-leg circuits has two serially connected capacitors with equal capacitances, and each of the other two single-leg circuits has two serially connected power electronic switch sets, with a connected point between the two power electronic switch sets or the two capacitors forming one of the middle points, two parallel connecting ends of the three single-leg circuits respectively forming the two DC terminals, and the controller connecting to every power electronic switch set.

4. The three-leg power converter apparatus as defined in claim 3, wherein the mid-terminal formed by the middle point between the two capacitors connects to one of the two terminals of the third input/output port while the other two mid-terminals being located at the two middle points between the power electronic switch sets connect to the filter circuit.

5. The three-leg power converter apparatus as defined in claim 1, wherein the filter circuit has two inductors with each inductor linking between one of the two terminals of the second input/output port and one of the mid-terminals connecting to the filter circuit.

6. The three-leg power converter apparatus as defined in claim 1, wherein the decoupling circuit has a transformer with a number of turns in primary coil of the transformer being equal to a number of turns in the secondary coil of the transformer, with one end of the primary coil forming with the first terminal, one end of the secondary coil forming with the second terminal, and the other ends of the primary and secondary coils connecting to each other together to form the third terminal.

7. The three-leg power converter apparatus as defined in claim 1, wherein the decoupling circuit has two capacitors with equal capacitances, with both of the capacitors providing one end to form the first and second terminals and another end connecting to each other together to form the third terminal.

8. The three-leg power converter apparatus as defined in claim 1, wherein the controller controls a plurality of power electronic switches of the three-leg bridge converter by current mode control to further control two currents passing through the mid-terminals connected with the filter circuit, with each of the two currents having a first component and a second component, with the first components of the two currents having equal values but opposite phases and the second components of the two currents having equal values and phases.

9. The three-leg power converter apparatus as defined in claim 8, wherein one of the first components flows out of the three-leg power converter apparatus through one of the terminals of the second input/output port while the other first component flows into the three-leg power converter apparatus through the other terminal of the second input/output port.

10. The three-leg power converter apparatus as defined in claim 8, wherein the second components flow into the decoupling circuit before passing through one of the two terminals of the third input/output port, a device connecting to the third input/output port, and another terminal of the third input/output port, or the second components flow out of the decoupling circuit after passing through one of the two terminals of the third input/output port, a device connecting to the third input/output port, and another terminal of the third input/output port.

11. The three-leg power converter apparatus as defined in claim 8, wherein the controller separately controls the first components and the second components to control output or input currents of the second and third input/output ports, so as to convert electrical power between the first, second and third input/output ports.

* * * * *